(12) United States Patent
Zhang et al.

(10) Patent No.: US 12,556,282 B2
(45) Date of Patent: Feb. 17, 2026

(54) OPTICAL DESIGN WITH INTEGRATED PHOTONICS

(71) Applicant: Finisar Shanghai Incorporation, Shanghai (CN)

(72) Inventors: Li Zhang, Shanghai (CN); Minghui Jia, Shanghai (CN); Hui Wang, Shanghai (CN); Liangpeng Guan, Shanghai (CN); Shanshan Zeng, Shanghai (CN)

(73) Assignee: Finisar Shanghai Incorporation, Shanghai (CN)

( * ) Notice: Subject to any disclaimer, the term of this patent is extended or adjusted under 35 U.S.C. 154(b) by 248 days.

(21) Appl. No.: 18/221,956

(22) Filed: Jul. 14, 2023

(65) Prior Publication Data
US 2024/0430010 A1    Dec. 26, 2024

(30) Foreign Application Priority Data

Jun. 20, 2023   (CN) .......................... 202310735688.7

(51) Int. Cl.
*H04B 10/50* (2013.01)

(52) U.S. Cl.
CPC .................. *H04B 10/503* (2013.01)

(58) Field of Classification Search
CPC .................................................. H04B 10/503
USPC ........................................................ 398/182
See application file for complete search history.

(56) References Cited

U.S. PATENT DOCUMENTS

| 10,107,977 | B2 * | 10/2018 | Brooks | ................ | G02B 6/4246 |
| 2005/0207720 | A1 * | 9/2005 | Lee | ........................ | G02B 6/266 |
| | | | | | 385/140 |
| 2005/0254746 | A1 * | 11/2005 | Fukuda | ................ | G02B 6/2821 |
| | | | | | 385/5 |
| 2017/0010415 | A1 * | 1/2017 | Jeong | ................... | G02B 6/4286 |
| 2021/0336416 | A1 * | 10/2021 | Yoffe | .................... | H01S 5/0683 |
| 2022/0247494 | A1 * | 8/2022 | Lee | ....................... | G02B 6/4246 |

FOREIGN PATENT DOCUMENTS

| CA | 3056519 | A1 * | 10/2018 | .......... | G02B 6/4257 |
| CN | 209946541 | U  * | 1/2020 | | |
| CN | 112946838 | A | 6/2021 | | |
| JP | 2017187709 | A * | 10/2017 | | |
| KR | 20220090517 | A * | 6/2022 | ............. | B23K 26/00 |
| KR | 20220090517 | A * | 6/2022 | .......... | B23K 26/382 |
| WO | WO-2011152202 | A1 * | 12/2011 | ............ | G02B 6/2861 |
| WO | WO-2023212427 | A1 * | 11/2023 | ............. | H04B 10/40 |

* cited by examiner

*Primary Examiner* — Amritbir K Sandhu
(74) *Attorney, Agent, or Firm* — The Webb Law Firm (57) ABSTRACT

An optical assembly includes a number of laser integrated circuits operative for outputting a like number of optical or laser signals. A lightwave circuit is positioned to receive the optical or laser signals and is operative to phase shift the optical or laser signals, combine the phase shifted optical or laser signals, and output the phase shifted and combined optical or laser signals. A lens is positioned to receive, focus and output the phase shifted and combined optical or laser signals output by the lightwave circuit to a core of a fiber-optic cable.

22 Claims, 6 Drawing Sheets

OPTICAL DESIGN WITH INTEGRATED PHOTONICS

CROSS-REFERENCE TO RELATED APPLICATION

This application claims priority to Chinese Patent Application No. 202310735688.7 filed Jun. 20, 2023, the disclosure of which is hereby incorporated by reference in its entirety.

BACKGROUND

1. Field

The present disclosure describes a new optical design with integrated photonics and, more specifically, a new transmit optical sub-assembly (TOSA).

2. Description of Related Art

Present TOSA designs based on free space optics include a number of different parts or components that are challenging to assembly. As a result, present TOSA designs are time consuming and costly to produce. One example TOSA design is disclosed in CN 112946838A.

An example TOSA design today includes a hard, physical connection between a laser (e.g., a laser chip or laser integrated circuit) mounted on or coupled to a supporting carrier or substrate, made of glass, and a waveguide formed on, or in, or supported by the supporting carrier or substrate. A metal receptacle for the isolator and lens is coupled or connected to the supporting carrier or substrate. One or more wire bonds that electrically connect the laser (e.g., a laser chip or laser integrated circuit) to one or more conductors on the supporting carrier or substrate need to be long enough to account for expected mechanical variations but not so long as to degrade RF performance.

The example present TOSA design is relatively large and difficult to fit into present enclosures. Moreover, a drawback of the supporting carrier or substrate being made of glass is that glass is not a good thermal conductor.

SUMMARY

Disclosed herein is an optical assembly comprising a laser unit including a first laser integrated circuit operative for outputting a first optical or laser signal and second laser integrated circuit for outputting a second optical or laser signal. A lightwave unit includes a lightwave circuit positioned to receive the first optical signal and the second optical signal. The lightwave circuit includes means for producing a phase shift between the first optical signal and the second optical signal, means for combining the phase shifted first optical signal and second optical signal, and means for outputting the phase shifted and combined first optical signal and second optical signal. Finally, the optical assembly includes an optical unit including a lens for focusing the phase shifted and combined first optical signal and second optical signal output by the means for outputting the phase shifted and combined first optical signal and second optical signal, and for outputting the focused and phase shifted combined first optical signal and second optical signal to a core of a fiber-optic cable that is not part of the optical assembly.

Also disclosed herein is an optical assembly comprising a plurality of laser integrated circuits operative for outputting a like plurality of optical or laser signals. A lightwave circuit is positioned to receive the plurality of optical or laser signals, The lightwave circuit is operative to phase shift the plurality of optical or laser signals, combine the phase shifted plurality of optical or laser signals, and output the phase shifted and combined plurality of optical or laser signals. A lens is positioned to receive, focus and output the phase shifted and combined plurality of optical or laser signals output by the lightwave circuit to a core of a fiber-optic cable.

DESCRIPTION

Various non-limiting examples will now be described with reference to the accompanying figures where like reference numbers correspond to like or functionally equivalent elements.

For purposes of the description hereinafter, terms like "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the disclosure. Hence, the specific examples or aspects disclosed herein are not to be construed as limiting.

Further, as used herein, all numbers expressing dimensions, physical characteristics, processing parameters, quantities of ingredients, reaction conditions, and the like, used in the specification and claims are to be understood as being modified in all instances by the term "approximately" or "about". Accordingly, unless indicated to the contrary, the numerical values set forth in the following specification and claims may vary depending upon the desired properties sought to be obtained by the present disclosure. At the very least, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

As used herein, "coupled", "coupling", and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Figure 1:
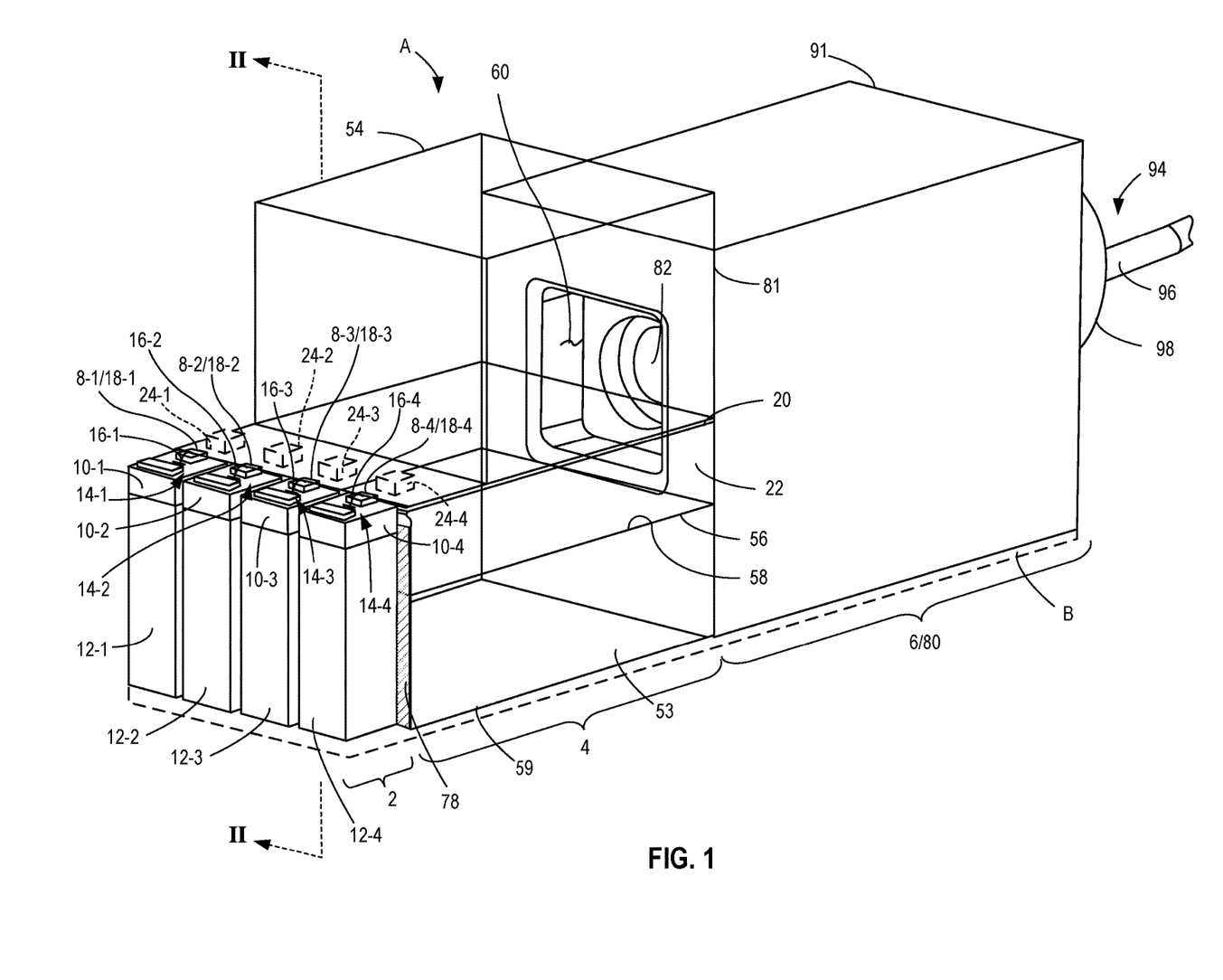
FIG. 1 is a perspective view of a non-limiting example TOSA in accordance with the principles of the present disclosure comprising, from left to right, a laser unit, a lightwave unit (shown partially transparent), and an optical unit coupled to a fiber optic cable.
Figure 2:
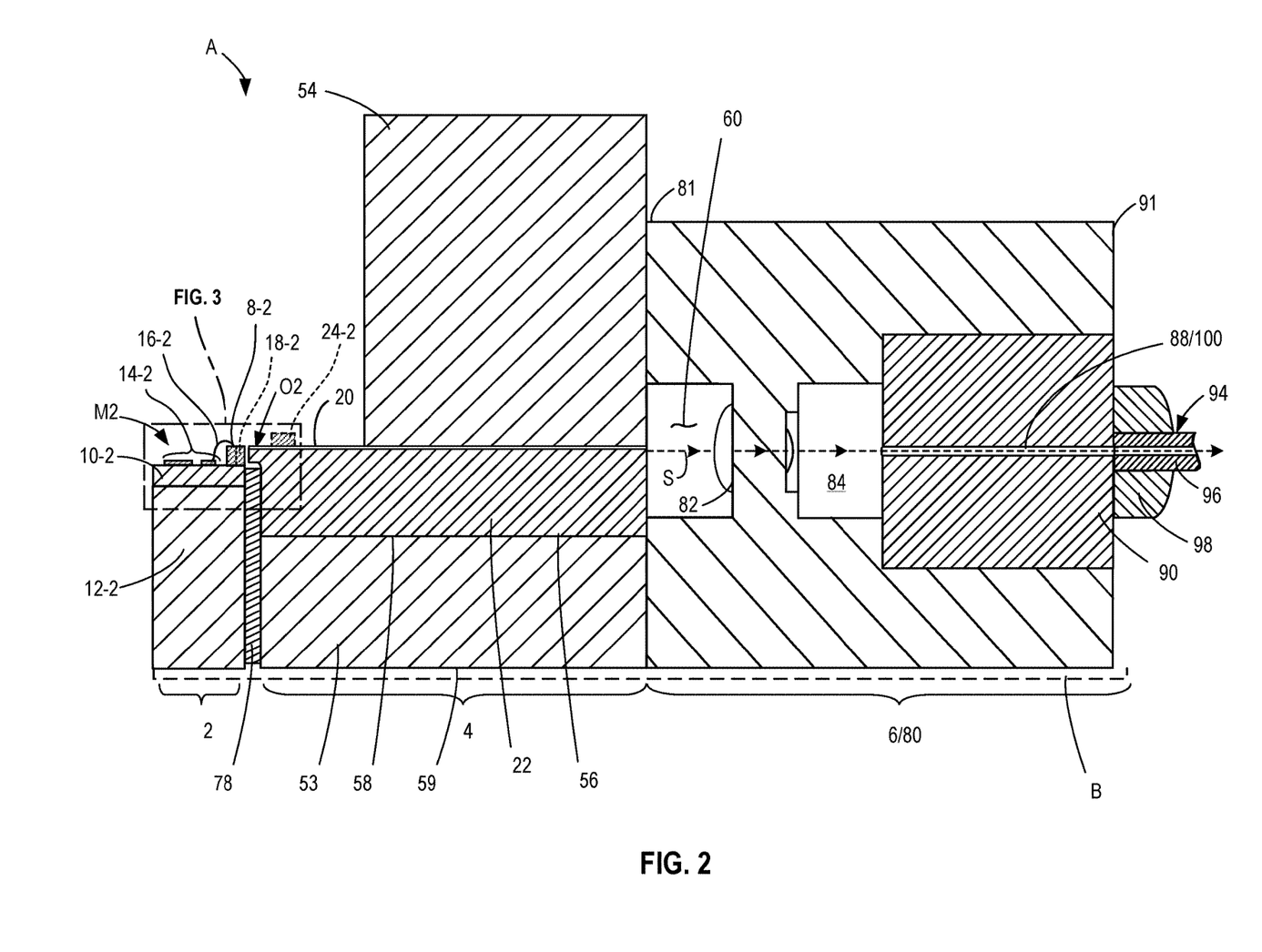
FIG. 2 is cross-section taken along lines II-II in FIG. 1.
Figure 3:
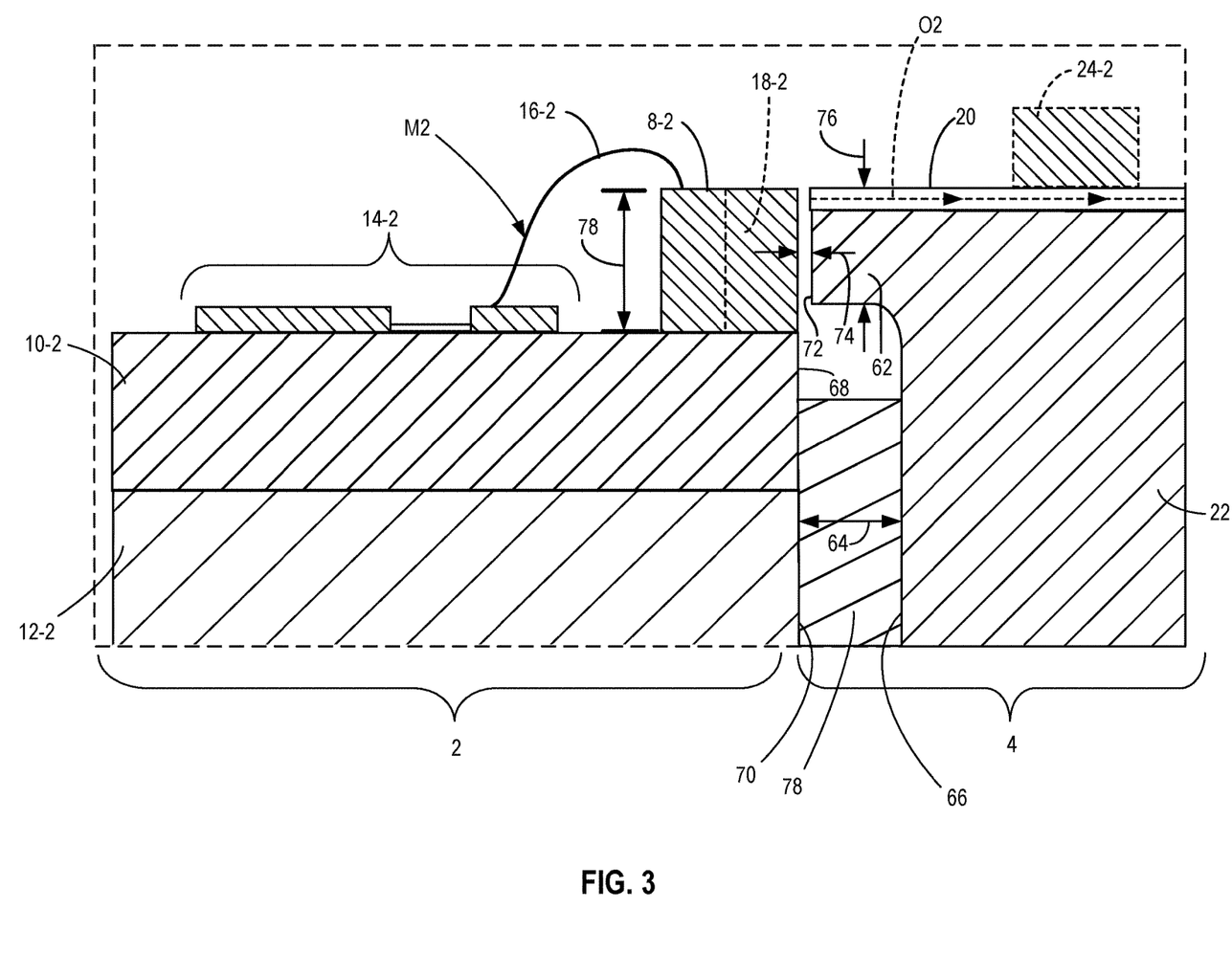
FIG. 3 is an enlarged view of features shown in the box labeled FIG. 3 in FIG. 2.

With reference to FIGS. 1-3, in some non-limiting embodiments or examples, an optical assembly A in accordance with the principles of the present disclosure may include a laser unit 2, a lightwave unit 4, and an optical unit 6, all mounted on an optional support or base B (shown in phantom).

In an example, the laser unit 2 may include a plurality of side or edge emitting laser integrated circuit (ICs) or chips 8 (hereinafter "laser IC(s)") which may, in a direct modulation mode, directly provide or output modulated optical or laser signals to the lightwave unit 4 or which, in an eternal modulation mode, may provide or output optical or laser signals to the lightwave unit 4 indirectly via modulators 18 of the laser unit 2. In an example, the laser unit 2 may, as shown in FIG. 1, include four laser ICs 8-1-8-4. However, this is not to be construed in a limiting sense since it is envisioned that the laser unit 2 may include any number of laser ICs 8 deemed suitable and/or desirable for a particular application. For example, laser unit 2 may include 2, 8, 16, 32, 48, 64, or more laser ICs 8.

In the example shown in FIG. 1, laser ICs 8-1-8-4 may be mounted, in any suitable and/or desirable manner, on or to a carrier substrate unit comprising carrier substrates 10-1-10-4 which may also have mounted thereon or thereto other, optional electronic components, e.g., one or capacitors (not shown) and/or signal sources 14-1-14-4, that support the operation of the laser ICs 8-1-8-4. In another example (not shown), all of the laser ICs 8-1-8-4 may be mounted on a carrier substrate unit comprising a single carrier substrate 10 along with the other, optional electronic components that support the operation of each laser integrated circuit 8-1-8-4. Of course, other combinations of the laser unit 2 including a carrier substrate unit comprising two or more carrier substrates 10, each of which supports two or more laser ICs 8 and portions of the other, optional electronic components that support the operation of each laser integrated circuit 8-1-8-4 are envisioned.

In an example, each carrier substrate 10 may be made from any suitable and/or desirable electrically insulating material, such as a ceramic, e.g., AlN, or conventional printed circuit board material, which may include conductive traces or lines, e.g., copper traces or lines, to connect the components mounted on the carrier substrate 10 to each other and/or to an external signal and/or power source needed for the operation of the laser integrated circuit 8 mounted to or on the carrier substrate 10.

Figure 4:
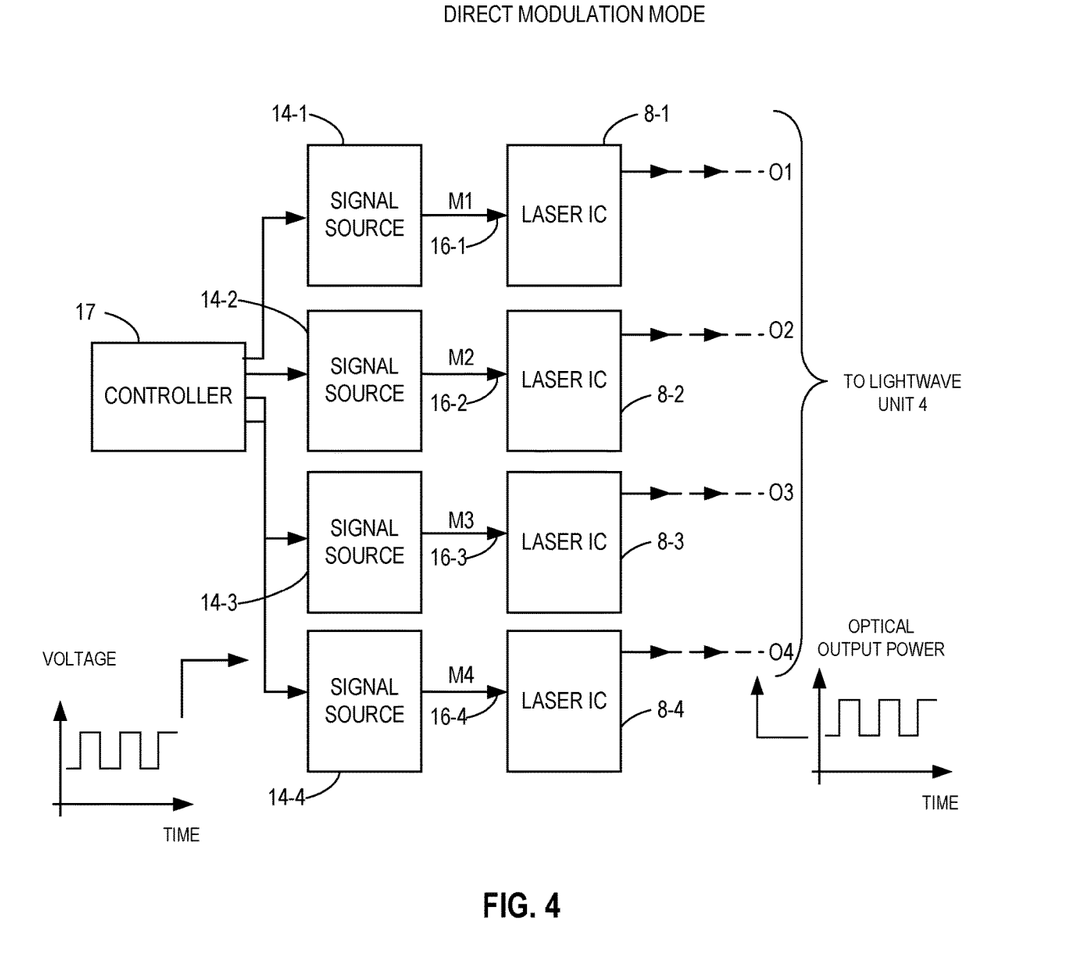
FIG. 4 is an example electrical schematic of the signal sources and the laser integrated circuits of the laser unit shown in FIG. 1 that may be used in a direct modulation mode.

With reference to FIG. 4 and with continuing reference to FIGS. 1-3, in an example, each of the laser ICs 8-1-8-4 may be used in a direct modulation mode, wherein unique modulated electrical signals M1-M4 may be provided to respective laser ICs 8-1-8-4 from the signal sources 14-1-14-4 via electrical conductors such as, for example, wire bonds 16-1-16-4. The data modulated on the electrical signals M1-M4 may be provided to each signal source 14-1-14-4 by a controller 17 which, in the examples described herein, may be provided off-board or externally to the carrier substrates 10-1-10-4 and which may be coupled to the signal source 14-1-14-4 in any suitable and/or desirable manner. When used in the direct modulation mode, each laser integrated circuit 8 may directly provide or output its modulated optical or laser signal O to the lightwave unit 4.

While FIGS. 1-3 show signal sources 14-1-14-4 disposed on carrier substrates 10-1-10-4. this is not to be construed in a limiting sense since it is envisioned that the signal sources 14-1-14-4 may not be included or mounted on the carrier substrates 10-1-10-4 but, rather, the signal sources 14-1-14-4 may be provided off-board or externally to the carrier substrates 10-1-10-4 and may be electrically connected to the carrier substrates 10-1-10-4 and/or the laser ICs 8-1-8-4 in any suitable and/or desirable manner.

Figure 5:
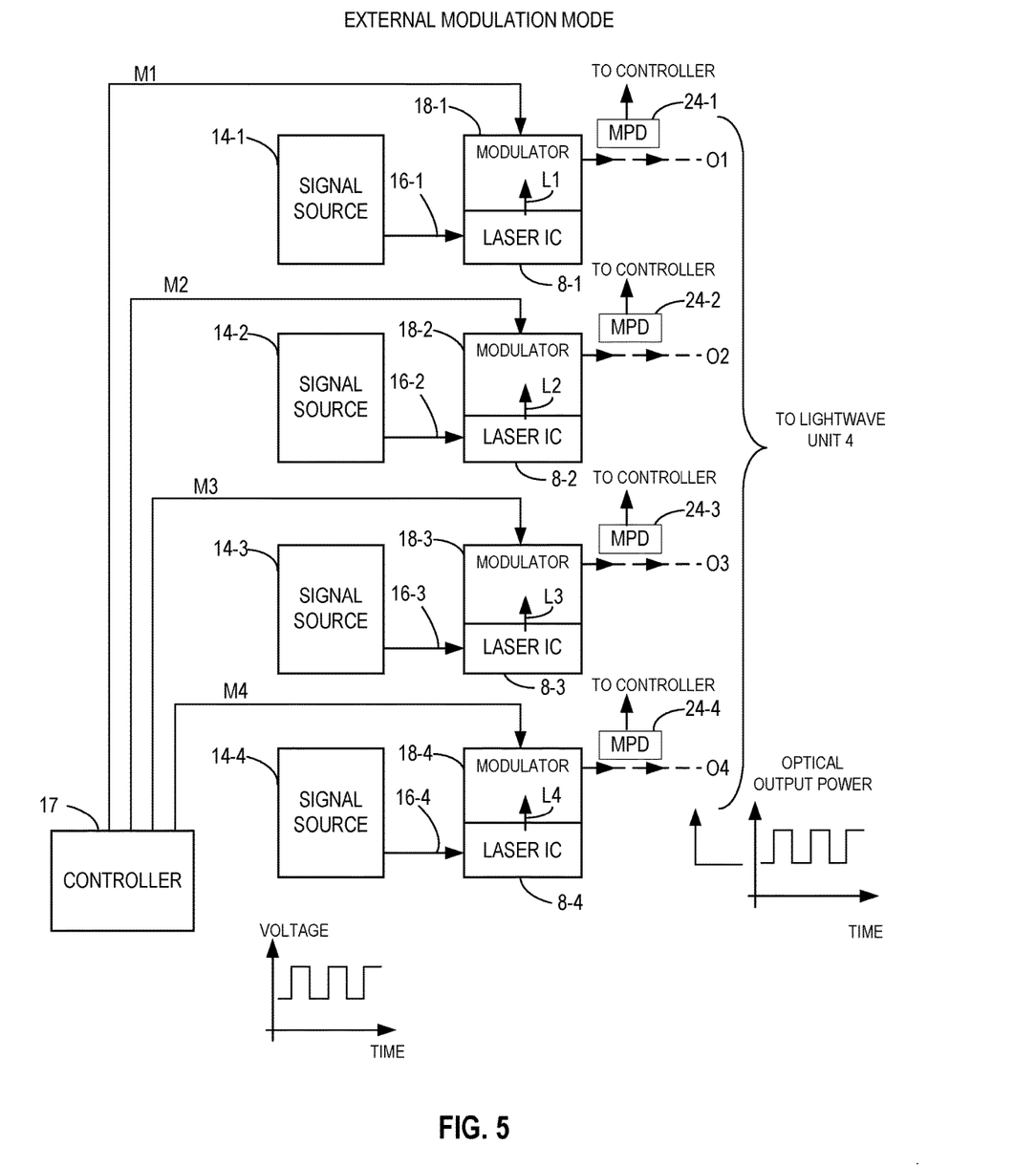
FIG. 5 is an example electrical schematic of the signal sources, laser integrated circuits, and modulators of the laser unit shown in FIG. 1 that may be used in an external modulation mode.

With reference to FIG. 5 and with continuing reference to FIGS. 1-3, in another example, each of the laser ICs 8-1-8-4 may be used in an external modulation mode, wherein the laser ICs 8-1-8-4 output different constant wavelength optical or laser signals L1-L4 to modulators 18-1-18-4, respectively. In response to modulation electrical signals M1-M4 being provided to the modulators 18-1-18-4 from the controller 17, the modulators 18-1-18-4 may modulate the optical or laser signals L1-L4 output by the respective laser ICs 8-1-8-4 and then directly provide or output the modulated optical or laser signals O1-O4 to the lightwave unit 4.

The lightwave unit 4 may include optional monitor photodiodes (MPDs) 24-1-24-4 positioned or disposed on a top surface of the lightwave unit 4 for detecting and converting scattered portions of the modulated optical or laser signals O1-O4 input into the lightwave unit 4 by the modulators 18-1-18-4 into corresponding electrical signals which may be provided as feedback to the controller 17 for controlling the modulation electrical signals M1-M4, e.g., for stability and consistency, being provided to the modulators 18-1-18-4 in a manner known in the art. In an example, the optional monitor photodiodes (MPDs) 24-1-24-4 may comprise means for detecting portions of the modulated optical or laser signals O1-O4 input into input optical waveguides of a lightwave circuit (described hereinafter) of the lightwave unit 4.

In the example shown in FIG. 5, each laser integrated circuit 8-1-8-4 and its respective modulator 18-1-18-4 may be integrated on the same die that is mounted on the carrier substrate 10, as shown in FIGS. 1-3. In another example (not shown), each modulator 18-1-18-4 may be a separate integrated circuit which may be optically coupled to its respective laser integrated circuit 8-1-8-4 in a manner known in the art, e.g., via an optical waveguide formed on the carrier substrates 10-1-10-4.

In an example, each example controller 17 described herein may include one or more processors, persistent/static and/or dynamic computer memory (e.g., without limitation, RAM, ROM, EPROM, EEPROM, etc.) used for storing volatile and non-volatile computer readable program code used, with or without feedback, for controlling the modulation electrical signals M1-M4, e.g., for stability and consistency.

With continuing reference to FIGS. 1-3, in an example, the laser unit 2 may also include one or more optional shims 12 which may support the laser ICs 8 at a suitable height for use with the lightwave unit 4 in manner described hereinafter. If the substrate unit comprising one or more substrates 10 can support the laser ICs 8 and/or modulators 18, if provided, at a suitable height for use with the lightwave unit 4 in manner described hereinafter without the use of the optional shims 12, the optional shims 12 may be omitted.

In the example shown in FIG. 1, the laser unit 2 includes a shim unit comprising four shims 12-1-12-4 which support carrier substrates 10-1-10-4 which in-turn support laser ICs 8-1-8-4, modulators 18-1-18-4, if provided, and signal sources 14-1-14-4, if provided. Of course, other combinations of the laser unit 2 including a shim unit comprising one or more shims 12, each of which supports one or more carrier substrates 10 which in-turn support one or more laser ICs 8, one or more modulators 14, if provided, and one or more signal sources 14, if provided, are envisioned. Accordingly, the number of substrates 10 comprising the substrate unit and/or the number of shims 12 comprising the shim unit used to support any number of laser IC(s) 8, modulator(s) 18, if provided, and signal sources(s) 14, if provided, is not to be construed in a limiting sense.

In an example, each shim 12 may be made from any suitable and/or desirable electrically insulating material, such as a ceramic, e.g., AlN. In an example, it is envisioned that the support and any electrical connection functions provided in the manner described above by one or more carrier substrates 10 may alternatively be provided by a top surface of the one or more shims 12, whereupon the one or more carrier substrates 10 may be omitted.

The lightwave unit 4 may include a lightwave circuit 20 formed on, or in, or supported by a substrate 22, e.g., a semiconductor substrate, and which may be positioned to receive the optical or laser signals O1-O4 output by the laser unit 2.

Figure 6:
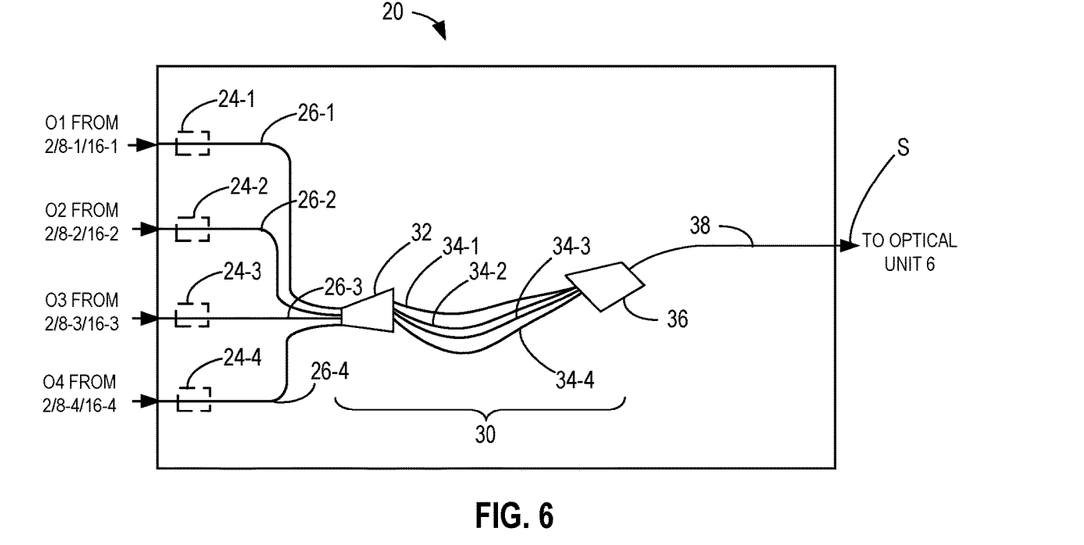
FIG. 6 is an example lightwave circuit of the lightwave unit shown in FIG. 1.

In an example shown in FIG. 6, the lightwave circuit 20 may comprise a 4×1 arrayed waveguide grating (AWG) 30 that includes an input coupler 32 which may, in a manner known in the art, couple the optical or laser signals O1-O4 having different wavelengths provided on, in, or to input optical waveguides 26-1-26-4 from the laser unit 2 to an array of optical waveguides 34-1-34-4 that have different physical lengths and thus apply different phase shifts at the exit of the optical waveguides 34-1-34-4 to an output coupler 36. The optical or laser signals O1-O4 may be provided directly to input optical waveguides 26-1-26-4 by laser ICs 8-1-8-4 (in the direct modulation mode) or via modulators 18-1-18-4 (in the external modulation mode). The output coupler 36 may, in a manner known in the art, combine the phase shifted different wavelength optical or laser signals O1-O4 into a single optical or laser signal S that is output via an output optical waveguide 38 to the optical unit 6.

In the example of lightwave circuit 20 comprising the AWG 30, the input coupler 32 and the bundle or array of optical fibers 34-1-34-4 may comprise means for producing a phase shift between the optical or laser signals O1-O4, the output coupler 36 may comprise means for combining the phase shifted optical or laser signals O1-O4 into the optical or laser signal S, and the output optical waveguide 38 may comprise means for outputting the phase shifted and combined optical or laser signals O1-O4 combined on the optical or laser signal S to the optical unit 6.

Figure 7:
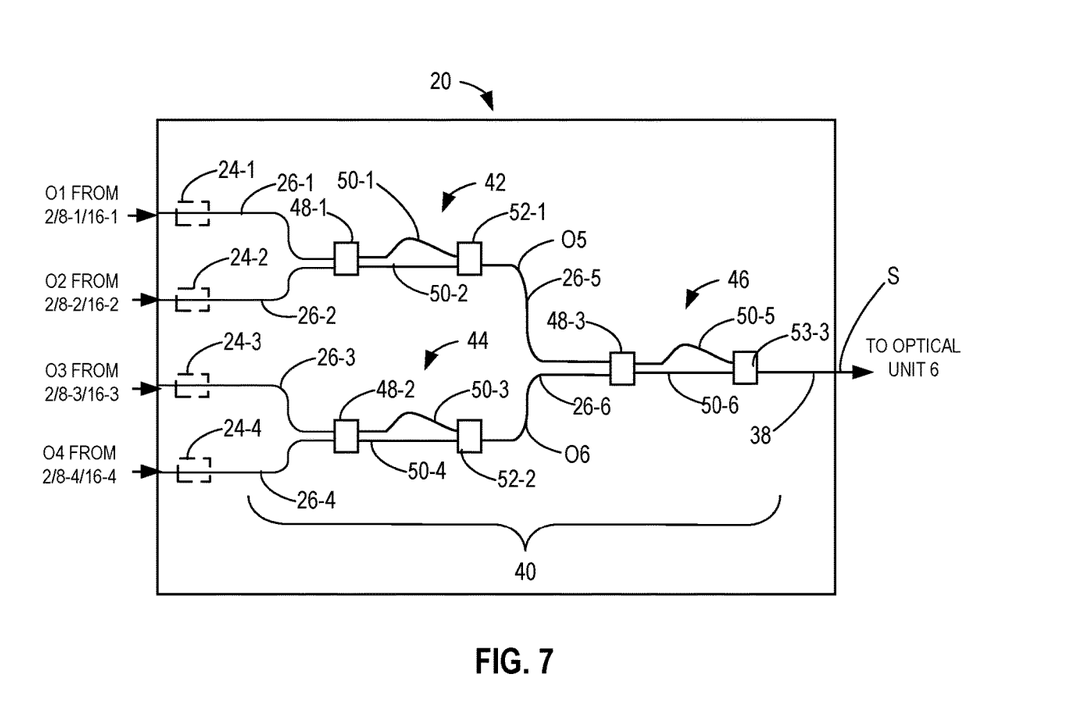
FIG. 7 is another example lightwave circuit of the lightwave unit shown in FIG. 1.

In another example shown in FIG. 7, the lightwave circuit 20 may include a 4×1 Mach-Zehnder interferometer (MZI) 40 comprised of a first, second and third 2×1 MZIs 42, 44 and 46 which may be utilized to combine the optical or laser signals O1-O4 having different wavelengths provided on, in, or to input optical waveguides 26-1-26-4 from the laser unit 2 into a single optical or laser signal S that is output via an output optical waveguide 38 to the optical unit 6. More specifically, the first MZI 42 may be optically coupled to receive, via input optical waveguides 26-1 and 26-2, the optical or laser signals O1-O2 from the laser unit 2. The first MZI 42 may be operative to phase shift the different wavelength optical or laser signals O1-O2 and combine the phase shifted different wavelength optical or laser signals O1-O2 into a single optical or laser signal O5 that is output on an optical waveguide 26-5.

The second MZI 44 may be optically coupled to receive, via input optical waveguides 26-3 and 26-4, the optical or laser signals O3-O4 from the laser unit 2. The second MZI 42 may be operative to phase shift the different wavelength optical or laser signals O3-O4 and combine the phase shifted different wavelength optical or laser signals O3-O4 into a single optical or laser signal O6 that is output on an optical waveguide 26-6.

The third MZI 46 may be optically coupled to receive the optical or laser signals O5-O6. via optical waveguides 26-5-26-6, from the respective first and second MZIs 42 and 44. The third MZI 44 may be operative to phase shift the optical or laser signals O5-O6 and combine the phase shifted different wavelength optical or laser signals O5-O6 into a single optical or laser signal S that is output via an output optical waveguide 38 to the optical unit 6.

The first MZI 42 may include an input coupler 48-1 which may, in a manner known in the art, couple the optical or laser signals O1-O2 having different wavelengths provided on, in, or to input optical waveguides 26-1-26-2 from the laser unit 2 to an array (e.g., pair) of optical waveguides 50-1-50-2 that have different physical lengths and thus apply different phase shifts at the exit of the optical waveguides 50-1-50-2 to an output coupler 52-1. The output coupler 52-1 may, in a manner known in the art, combine the phase shifted different wavelength optical or laser signals O1-O2 into the optical or laser signal O5 that is output via the optical waveguide 26-5 to an input optical coupler 48-3 of the third MZI 46.

In a manner similar to the first MZI 42, the second MZI 44 may include an input coupler 48-2 which may, in a manner known in the art, couple the optical or laser signals O3-O4 having different wavelengths provided on, in, or to input optical waveguides 26-3-26-4 from the laser unit 2 to an array (e.g., pair) of optical waveguides 50-3-50-4 that have different physical lengths and thus apply different phase shifts at the exit of the optical waveguides 50-3-50-4 to an output coupler 52-2. The output coupler 52-2 may, in a manner known in the art, combine the phase shifted different wavelength optical or laser signals O3-O4 into the optical or laser signal O6 that is output via the optical waveguide 26-6 to the input optical coupler 48-3 of the third MZI 46.

The input coupler 48-3 of the third MZI 46 may, in a manner known in the art, couple the optical or laser signals O5-O6 provided on, in, or to optical waveguides 26-5-26-6 to an array (e.g., pair) of optical waveguides 50-5-50-6 that have different physical lengths and thus apply different phase shifts at the exit of the optical waveguides 50-5-50-6 to an output coupler 52-3. The output coupler 52-3 may, in a manner known in the art, combine the phase shifted optical or laser signals O5-O6 into the single optical or laser signal S that is output via the output optical waveguide 38 to the optical unit 6. In this example, the single optical or laser signal S may comprise the combination of the phase shifted optical or laser signals O1-O4.

In the example of lightwave circuit 20 comprising the 4×1 MZI 40, the input couplers 48-1-48-3 and the bundle or array of optical fibers 50-1-50-6 may comprise means for producing a phase shift between the optical or laser signals O1-O4, the output couplers 52-1-52-3 may comprise means for combining the phase shifted optical or laser signals O1-O4, and the output optical waveguide 38 may comprise means for outputting the phase shifted optical or laser signals O1-O4, combined on the optical or laser signal S, to the optical unit 6.

The example lightwave circuits 20, comprising the AWG 30 or the MZI 40, described above are strictly for the purpose of illustration and are not to be construed in a limiting sense since it is envisioned that the lightwave circuit 20 may comprise any suitable and/or desirable circuit or circuitry selected by one skilled in the art for a particular application of the optical assembly described herein. Accordingly, the description herein of the lightwave circuits 20 comprising the AWG 30 or the MZI 40 is not to be construed in a limiting sense.

In an example, it is envisioned that the lightwave circuit 20 may be formed on or in the top surface of the semiconductor substrate 22 via conventional semiconductor fabrication techniques. In another example, the lightwave circuit 20 may be formed on or in a separate substrate that may be attached, bonded, or adhered on or to the top surface of the semiconductor substrate 22 in any suitable and/or desirable manner. A top surface of the lightwave circuit 20 may include a protective passivation layer.

With continuing reference to FIGS. 1-3, in an example, the lightwave unit 4 may include an optional bottom or base substrate 53, e.g., a base semiconductor substrate. The semiconductor substrate 22 may be positioned or disposed on a top surface of the optional base semiconductor substrate 53 and may be attached, bonded, or adhered thereon or thereto. The optional base semiconductor substrate 53 may be used, as needed, to support the lightwave circuit 20 at a suitable height relative to the laser unit 2 for use in the manner described above to receive the optical or laser signals O output by the laser ICs 8 and, if provided, the modulators 18 of the laser unit 2.

In an example, the lightwave unit 4 may include an optional cap or top layer or substrate 54, e.g., a top semiconductor substrate, positioned or disposed on a top surface of the lightwave circuit 20, e.g., on top of the passivation layer, and which may be attached, bonded, or adhered thereon or thereto. The top semiconductor substrate 54 may be used as a protective cover layer for the lightwave circuit 20 and/or for the dissipation of heat generated in the lightwave circuit 20 in response to propagation of optical or laser signals O from the laser unit 2 through the elements, e.g., waveguides and couplers, of the lightwave circuit 20.

The top semiconductor substrate 54 may be of any size and may cover any portion or all of the top surface of the lightwave circuit 20 as may be deemed suitable and/or desirable. In an example, the top semiconductor substrate 54, when present on top of the lightwave circuit 20, may, as shown in FIGS. 1 and 2, cover only a portion of the top surface of the lightwave circuit 20. For example, as shown in FIGS. 1 and 2, the top semiconductor substrate 54 may only cover the portion of the top surface of the lightwave circuit 20 proximate or adjacent to the optical unit 6, e.g., to optionally aid in avoiding, preventing or reducing the entry of ambient light into an input aperture 60 of the optical unit 6. In another example, where the lightwave unit 4 includes the optional monitor photodiodes 24 mounted on a top surface of the lightwave circuit 20, the top semiconductor substrate 54 may only cover the portion of the top surface of the lightwave circuit 20 spaced from the monitor photodiodes 24, as is shown in FIGS. 1 and 2. However, the top semiconductor substrate 54 covering only a portion of the top surface of the lightwave circuit 20 is not to be construed in a limiting sense since it is envisioned that, when the monitor photodiodes 24 are not present on the top surface of the lightwave circuit 20, the top semiconductor substrate 54 may cover all or substantially all of the top surface of the lightwave circuit 20. In an example, the amount of the top surface of the lightwave circuit 20 covered by the top semiconductor substrate 54 and/or the position of the top semiconductor substrate 54 on the top surface of the lightwave circuit 20 may be preferentially selected to optimize the removal of heat generated in the lightwave circuit 20 in response to propagation of optical or laser signals O from the laser unit 2 through the elements of the lightwave circuit 20.

In an example shown best in FIG. 3, the semiconductor substrate 22 may include a cantilever portion 62 that extends toward the laser ICs 8 and, if present, the modulators 18 of the laser unit 2 and which defines under the cantilever portion 62 a gap or space 64 between a side 66 of the semiconductor substrate 22 on which the lightwave circuit 20 is formed on or supported by and side(s) 68 and/or 70 of one or more substrates 10 and/or shims 12 of the laser unit 2. In an example a distal end 72 of the cantilever portion 62 and sides of the laser ICs 8 or, when present, the modulators 18 of the laser unit 2 may be spaced from each other by an air gap or space 74.

In an example, a length or distance of gap or space 64 may be between 20 μm and 100 μm and a length or distance of gap or space 74 may be between 3 μm and 10 μm. In an example, a top-to-bottom thickness or height 76 of the cantilever portion 62 may be no greater than, and is desirably less than, a top-to-bottom thickness or height 78 of the laser ICs 8 and/or, if present, the modulators 18 of the laser unit 2. In an example, height 76 may be less than 80 μm.

In an example, an adhesive 78, for example, an epoxy, may be disposed in the gap or space 64 to secure the semiconductor substrate 22 in a fixed position with respect to the one or more carrier substrates 10 and/or the one or more shims 12. More specifically, adhesive 78 may fix the length or distance of the air gap or space 74 between the distal end 72 of the cantilever portion 62 and sides of the laser ICs 8 or, when present, the modulators 18 of the laser unit 2 that face the distal end 72 of the cantilever portion 62.

In an example, the gap or space 64 under the cantilever portion 62 may be formed in any suitable and/or desirable manner. In one example, the gap or space 64 may be formed by running or moving a rotating dicing or wafer saw blade in a upward direction (as oriented in FIGS. 1-3) along an edge of the semiconductor substrate 22 and, if provided, an edge of the optional base semiconductor substrate 53, and stopping the movement of the dicing saw blade before it reaches top surface of the semiconductor substrate 22, thereby forming the cantilever portion 62 with the gap or space 64 under the cantilever portion 62.

As shown in FIGS. 1 and 2, a bottom surface 56 of semiconductor substrate 22 and a top surface 58 of the optional base semiconductor substrate 53 may be the same size or substantially the same size whereupon the gap or space 64 may extend between an underside of cantilever portion 62 to a bottom surface 59 the optional base semiconductor substrate 53. The adhesive 78 may also be disposed in the portion of the gap or space 64 between the facing surfaces of the one or more shims 12 and the optional base semiconductor substrate 53.

With continuing reference to FIG. 1 and, in particular, FIG. 2, the optical unit 6 may include a housing 80 that has a first end 81 wherein a lens 82, e.g., a polyetherimide (PEI) lens, is supported in the input aperture 60 which is formed in the housing 80 of the optical unit 6 in the path of the optical or laser signal S output by lightwave circuit 4. The housing 80, including a space or distance between the lens 82 and an optical isolator 84 (described hereinafter) may also be formed of PEI.

The lens 82 focuses the optical or laser signal S and outputs the focused optical or laser signal S to an optical isolator 84. In a manner know in the art, the optical isolator 84 allows the optical or laser signal S to pass to an optical fiber 88 of a fiber pigtail assembly 90 of optical unit 6, but wholly or partially blocks reflections of the optical or laser signal S output by the optical fiber 88 toward the lens 82. The fiber pigtail assembly 90 with the optical fiber 88 is supported at a second end 91 of the housing 80 in alignment with the optical or laser signal S output by the lens 82 and the optical isolator 84.

The optical fiber 88 may be part of an optical fiber cable 94, that is not, per se, part of the optical assembly, that includes a cladding 96 which surrounds and protects the optical fiber 88 outside of fiber pigtail assembly 90. In the example shown in FIG. 2, the cladding 96 may be removed from the portion of the optical fiber 88 inside of fiber pigtail assembly 90. A protective covering 98, e.g., formed of an epoxy, may surround the cladding 96 proximate or adjacent where the optical fiber 88 enters the fiber pigtail assembly 90 to avoid the entry of dust and other unwanted particles or contaminants into a bore 100 of fiber pigtail assembly 90 in which the optical fiber 88 is disposed within the fiber pigtail assembly 90.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. An optical assembly comprising:
   a laser unit including a first side or edge emitting laser integrated circuit operative for outputting a first optical or laser signal and second side or edge emitting laser integrated circuit for outputting a second optical or laser signal;
   a lightwave unit including a lightwave circuit disposed on or in or attached, bonded, or adhered to a top surface of a substrate positioned to receive, without reflection, the first optical signal and the second optical signal, the lightwave circuit including
      means for producing a phase shift between the first optical signal and the second optical signal,
      means for combining the phase shifted first optical signal and second optical signal, and
      means for outputting the phase shifted and combined first optical signal and second optical signal; and
   an optical unit including a lens for focusing the phase shifted and combined first optical signal and second optical signal output by the means for outputting the phase shifted and combined first optical signal and second optical signal, and for outputting the focused and phase shifted combined first optical signal and second optical signal to a core of a fiber-optic cable that is not part of the optical assembly.

2. The optical assembly of claim 1, wherein the means for outputting the phase shifted and combined first optical signal and second optical signal is an optical waveguide.

3. The optical assembly of claim 1, wherein the optical unit includes an optical isolator in a path of the focused and phase shifted combined first optical signal and second optical signal between the lens and the core of the fiber-optic cable.

4. The optical assembly of claim 1, wherein the lightwave unit includes the substrate supported atop of a base substrate.

5. The optical assembly of claim 4, wherein the lightwave unit includes a cap substrate positioned atop of at least a portion of the substrate on which the lightwave circuit is disposed on or in or attached, bonded, or adhered to.

6. The optical assembly of claim 1, wherein the laser unit includes a substrate unit, a shim unit, or both supporting the first laser integrated circuit and the second laser integrated circuit with their respective optical outputs aligned with inputs of first and second input optical waveguides of the lightwave circuit which are optically coupled to the means for producing the phase shift between the first optical signal and the second optical signal.

7. The optical assembly of claim 6, further including means for detecting portions of the first and second optical signals travelling in the first and second input optical waveguides of the lightwave circuit and for outputting first and second electrical signals related to the detected portions of the first and second optical signals travelling in the first and second input optical waveguides.

8. The optical assembly of claim 6, wherein:
   the shim unit comprises first and second shims for the first laser integrated circuit and the second laser integrated circuit;
   the first laser integrated circuit is positioned atop of the first shim; and
   the second laser integrated circuit is positioned atop of the second shim.

9. The optical assembly of claim 1, wherein the lightwave circuit includes:
   first and second input optical waveguides positioned to receive input optical signals output by the first laser integrated circuit and the second laser integrated circuit and to provide said input optical signals to the means for producing the phase shift between the first optical signal and the second optical signal; and first and second photodiodes positioned to detect portions of the input optical signals travelling in the first and second input optical waveguides and for outputting first and second electrical signals related to the detected first and second input optical signals travelling in the first and second input optical waveguides.

10. The optical assembly of claim 1, wherein the substrate includes a cantilever portion that extends toward the first and second laser integrated circuits and defines under the cantilever portion a gap or space between a side of the substrate on which the lightwave circuit is disposed on or in or attached, bonded, or adhered to and a side of one or more substrates, or shims, or both of the laser unit that support the first and second laser integrated circuits.

11. The optical assembly of claim 10, wherein a distal end of the cantilever portion and sides of the first and second laser integrated circuits are spaced from each other by another gap or space.

12. The optical assembly of claim 10, wherein:
the laser unit includes first and second modulators in paths of the first and second optical or laser signals output by the first and second laser integrated circuits; and
a distal end of the cantilever portion and sides of the first and second modulators are spaced from each other by another gap or space.

13. The optical assembly of claim 10, further including an adhesive disposed in the gap or space.

14. An optical assembly comprising:
a plurality of side or edge emitting laser integrated circuits operative for outputting a like plurality of optical or laser signals;
a lightwave circuit disposed on or in or attached, bonded, or adhered to a top surface of a substrate and positioned to receive, without reflection, the plurality of optical or laser signals, the lightwave circuit operative to phase shift the plurality of optical or laser signals, combine the phase shifted plurality of optical or laser signals, and output the phase shifted and combined plurality of optical or laser signals; and
a lens positioned to receive, focus and output the phase shifted and combined plurality of optical or laser signals output by the lightwave circuit to a core of a fiber-optic cable.

15. The optical assembly of claim 14, further including an optical isolator in a path of the focused, phase shifted and combined plurality of optical or laser signals output by the lightwave circuit between the lens and the core of the fiber-optic cable.

16. The optical assembly of claim 14, wherein:
the plurality of laser integrated circuits are supported by a substrate unit, a shim unit, or both; and
the lens is supported by a housing.

17. The optical assembly of claim 16, wherein the lightwave circuit substrate includes a cantilever portion that extends toward the plurality of laser integrated circuits and a gap or space under the cantilever portion between a side of the lightwave circuit substrate under the cantilever portion and a side of the substrate unit, the shim unit, or both.

18. The optical assembly of claim 17, wherein the substrate unit, the shim unit, or both includes one or more substrates or shims supporting the plurality of laser integrated circuits.

19. The optical assembly of claim 17, wherein a distal end of the cantilever portion and sides of the plurality of laser integrated circuits are spaced from each other by another gap or space.

20. The optical assembly of claim 17, further including:
a plurality of modulators in paths of the plurality of optical or laser signals output by the plurality of laser integrated circuits; and
a distal end of the cantilever portion and sides of the plurality of modulators are spaced from each other by another gap or space.

21. The optical assembly of claim 17, further including an adhesive disposed in the gap or space.

22. The optical assembly of claim 16, further including at least one of the following:
the lightwave circuit substrate formed on, supported by, or positioned atop of a base substrate; and
a cap substrate positioned atop of at least a portion of the lightwave circuit substrate.

* * * * *